(12) United States Patent
Arai et al.

(10) Patent No.: US 12,007,622 B2
(45) Date of Patent: Jun. 11, 2024

(54) OPTICAL UNIT

(71) Applicant: NIDEC SANKYO CORPORATION, Nagano (JP)

(72) Inventors: Tsutomu Arai, Nagano (JP); Shinji Minamisawa, Nagano (JP); Takeshi Sue, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 463 days.

(21) Appl. No.: 17/486,933

(22) Filed: Sep. 28, 2021

(65) Prior Publication Data
US 2022/0099922 A1    Mar. 31, 2022

(30) Foreign Application Priority Data

Sep. 29, 2020 (JP) .................................. 2020-163466

(51) Int. Cl.
| | | |
|---|---|---|
| *G02B 7/18* | (2021.01) | |
| *G02B 7/00* | (2021.01) | |
| *G02B 7/02* | (2021.01) | |
| *G03B 17/12* | (2021.01) | |
| *H04N 23/51* | (2023.01) | |
| *H04N 23/55* | (2023.01) | |

(52) U.S. Cl.
CPC .......... *G02B 7/1805* (2013.01); *G02B 7/003* (2013.01); *G02B 7/026* (2013.01); *G03B 17/12* (2013.01); *H04N 23/51* (2023.01); *H04N 23/55* (2023.01)

(58) Field of Classification Search
CPC ...... G02B 7/1805; G02B 7/003; G02B 7/026; H04N 23/51; H04N 23/55; G03B 17/12
USPC .......................................................... 359/831
See application file for complete search history.

(56) References Cited

U.S. PATENT DOCUMENTS

2018/0364450 A1* 12/2018 Lee ........................ H04N 23/55

* cited by examiner

*Primary Examiner* — Wyatt A Stoffa
*Assistant Examiner* — Mitchell T Oestreich
(74) *Attorney, Agent, or Firm* — JCIPRNET

(57) ABSTRACT

An optical unit including a reflection portion, a movable body, a fixed body; and a rotation support mechanism that rotates the movable body with respect to the fixed body in an axial direction as a rotation axis, in which the rotation support mechanism has a U-shaped spring member disposed between the fixed body and the movable body in the axial direction and applies a force in a direction that widens the space between the fixed body and the movable body, the spring member has a rotation-axis first forming member, the movable body has a rotation-axis second forming member, and the rotation-axis first forming member and the rotation-axis second forming member are arranged at positions where a rotation axis passes through a center of gravity position of the movable body.

8 Claims, 12 Drawing Sheets

OPTICAL UNIT

CROSS REFERENCE TO RELATED APPLICATION

The present invention claims priority under 35 U.S.C. § 119 to Japanese Application No. 2020-163466 filed Sep. 29, 2020, and the entire content of which is incorporated herein by reference.

BACKGROUND

Field of the Invention

At least an embodiment of the present invention relates to an optical unit.

Description of the Related Documents

Various optical units have conventionally been used. Among them, an optical unit which allows a movable body, which includes a reflection portion that reflects an incident light flux from outside toward an imaging element, to move to a fixed body is used. For example, Patent Document 1 discloses a camera module that uses a spherical body provided in an area between a rotating holder including a reflection portion and a housing, and rotates the rotating holder with respect to the housing so that a facing angle between a surface of the rotating holder and a surface of the housing in the area between the spherical body and the housing changes, using the spherical body as a rotation center.

In the optical unit of the structure in US2018/0364450, the rotating holder is rotated with respect to the housing so that the facing angle between the surface of the facing rotating holder and the surface of the housing changes, so if a gap between the surface of the facing rotating holder and the surface of the housing is small, the rotating holder and the housing will soon interfere with each other as the rotating holder is rotated with respect to the housing, and a movable range becomes small. On the other hand, it is difficult to widen the gap between the surface of the facing movable body and the surface of the fixed body because widening of the gap between the surface of the facing movable body and the surface of the fixed body makes it difficult to reduce the size of the device. Therefore, it is an object of at least an embodiment of the present invention to increase the movable range in an optical unit having a rotation mechanism to rotate a movable body supporting a reflection portion with respect to a fixed body. In the optical unit of the structure in Patent Document 1, the position of the center of gravity of the rotating holder is far from the position of the spherical body as a rotation axis and thus, the rotating holder easily sags by its own weight, and power consumption becomes large in order to prevent it, which is a disadvantage.

SUMMARY

The optical unit of at least an embodiment of the present invention includes: a reflection portion, configured to reflect an incident light flux incident from outside in a reflection direction from an incident direction to an imaging element on a reflection surface; a movable body, configured to support the reflection portion; a fixed body; and a rotation support mechanism, configured to rotate the movable body with respect to the fixed body with an axial direction crossing the incident direction and the reflection direction as a rotation axis, in which the rotation support mechanism has a U-shaped spring member that is disposed between the fixed body and the movable body in the axial direction and applies a force in a direction to widen a space between the fixed body and the movable body in the axial direction; the spring member has a rotation-axis first forming member that constitutes the rotation axis; the movable body has a rotation-axis second forming member that constitutes the rotation axis together with the rotation-axis first forming member; and the rotation-axis first forming member and the rotation-axis second forming member are disposed at positions where the rotation axis passes through a center of gravity position of the movable body.

Here, "the center of gravity position of the movable body" does not mean the center of gravity position itself in a strict sense, but means the substantial center of gravity position of the movable body, that is, includes an area around the center of gravity position of the movable body. According to this aspect, the U-shaped spring member that applies a force in the direction to widen the space between the fixed body and the movable body in the axial direction is provided, and the rotation-axis first forming member provided on the spring member and the rotation-axis second forming member provided on the movable body form the rotation axis disposed at the position passing through the substantial center of gravity position of the movable body. By forming such rotation axis at the position passing through the center of gravity position of the movable body, the movable range of the movable body with respect to the fixed body can be increased even if the gap between the surface of the movable body and the surface of the fixed body where the rotation-axis first forming member and the rotation-axis second forming member are formed is narrowed.

In the optical unit of at least an embodiment of the present invention, one of the rotation-axis first forming member and the rotation-axis second forming member has a convex spherical surface and the other of the rotation-axis first forming member and the rotation-axis second forming member has a concave spherical surface on which the convex spherical surface slides. With this configuration, the rotation-axis first forming member and the rotation-axis second forming member can be brought into point contact, which reduces a sliding load and allows a small bearing structure.

In the optical unit of at least an embodiment of the present invention, the convex spherical surface can be configured to be formed by fixing, to a base having a hole, a spherical body having a diameter larger than the hole. With this configuration, the bearing structure can be easily configured.

In the optical unit of at least an embodiment of the present invention, the spring member is fixed at a fixed position of the fixed body by being inserted in an insertion direction crossing the axial direction in the space, and has a protruding portion that protrudes in a direction opposite to the insertion direction and is displaceable in a displacement direction crossing the insertion direction, and the fixed body can be configured to have a hooking portion on which the protruding portion is displaced in the displacement direction and hooked as the spring member is inserted at the fixed position. With this configuration, it is possible to prevent the spring member fixed at the fixed position from coming out in the direction opposite to the insertion direction.

In the optical unit of at least an embodiment of the present invention, the movable body may be configured such that the movable body has an arc-shaped groove with the center of rotation of the rotation axis as the center of rotation, and the spring member has a convex portion that is inserted into the groove. With this configuration, it is possible to prevent the movable body from being removed from the spring member and the movable body from coming out of the fixed body, and it is also possible to prevent rotation of the movable body with respect to the fixed body from being hindered by interference between the groove and the convex portion.

In the optical unit of at least an embodiment of the present invention, the groove can be configured to have such a length that the groove and the convex portion are not in contact with each other in an arc direction even when the movable body is rotated at the maximum as the movable body is rotated with respect to the fixed body. With this configuration, even when the movable body is rotated at the maximum with respect to the fixed body, it is possible to prevent rotation of the movable body with respect to the fixed body from being hindered by interference between the groove and the convex portion. In addition, damage on the convex portion and the arc-shaped groove, which are structurally difficult to be made robust, can be suppressed by configuring such that the convex portion and the arc-shaped groove are not used as regulation portions for the rotation of the movable body in the arc direction.

In the optical unit of at least an embodiment of the present invention, such configuration can be realized that the spring member is fixed at a fixed position of the fixed body by being inserted in the insertion direction in the space, and a contact position with the fixed body in the widening direction is a position aligned with the rotation axis. With this configuration, the point of action of force by the fixed body on the spring member can be aligned with the rotation axis, and misalignment of the rotation axis can be effectively suppressed.

In the optical unit of at least an embodiment of the present invention, the fixed body can be configured such that a depression or an opening is formed on an extension line in a direction of movement accompanying a rotation of the movable body. With this configuration, the movable range of the movable body with respect to the fixed body can be widened particularly effectively.

The optical unit of at least an embodiment of the present invention having a rotation mechanism for rotating the movable body supporting the reflection portion with respect to the fixed body can increase the movable range.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

An embodiment of the present invention will be described below on the basis of the drawings. In each of the drawings, an X-axis, a Y-axis and a Z-axis represent directions orthogonal to each other, and it is assumed that a view as seen in +X direction and −X direction is referred to as a side view, a view as seen in +Y direction is referred to as a plan view, a view as seen in −Y direction is referred to as a bottom view, a view as seen in +Z direction is referred to as a rear view, and a view as seen in −Z direction is referred to as a front view. Further, the +Y direction corresponds to an incident direction D1 of a light flux from outside.

[Outline of Device Including Optical Unit]

Figure 1:
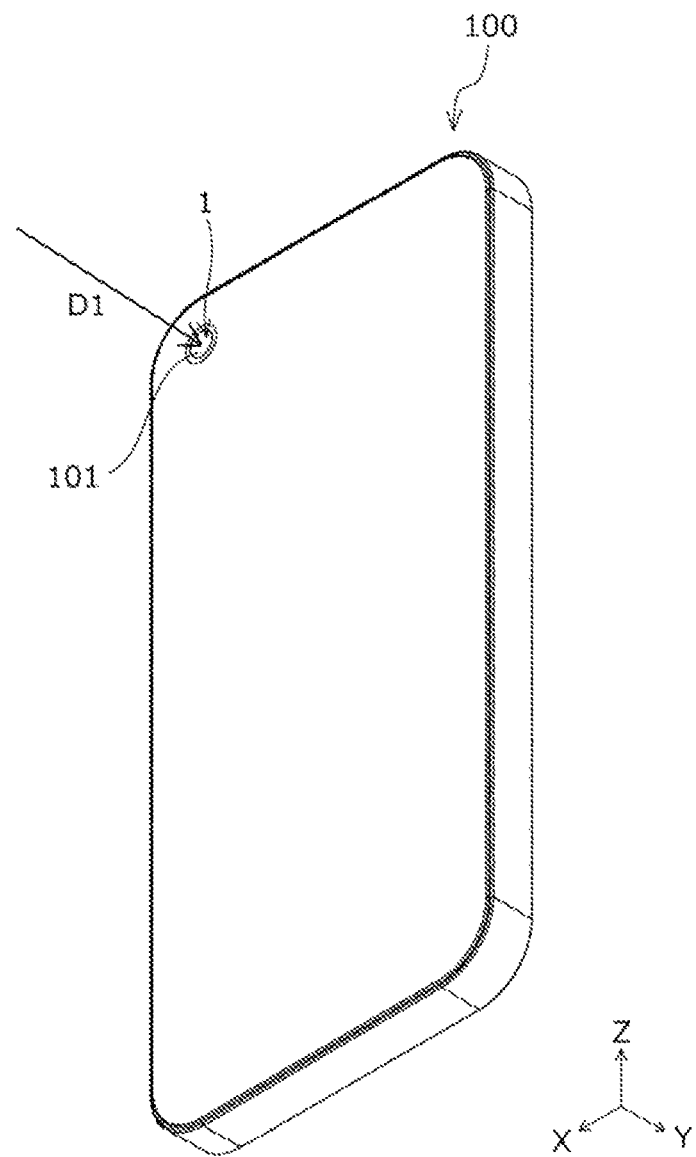
FIG. 1 is a perspective view of a smartphone including an optical unit according to one embodiment of the present invention.

FIG. 1 is a schematic perspective view of a smartphone 100 as an example of a device including an optical unit 1 of the present embodiment. The optical unit 1 of the present embodiment can be used suitably in the smartphone 100. The optical unit 1 of the present embodiment can be configured to be thin, which is for making thickness of the smartphone 100 in the Y-axis direction small. However, the optical unit 1 of the present embodiment is not limited to the smartphone 100, and can be used in various devices that are not particularly limited, such as cameras and videos.

As illustrated in FIG. 1, the smartphone 100 includes a lens 101 on which a light flux is incident. Inside the lens 101 of the smartphone 100, the optical unit 1 is provided. The smartphone 100 is configured to allow the light flux to be incident from the outside in the incident direction D1 via the lens 101, and to enable capturing of a subject image on the basis of the incident light flux.

[Overall Configuration of Optical Unit]

Figure 2:
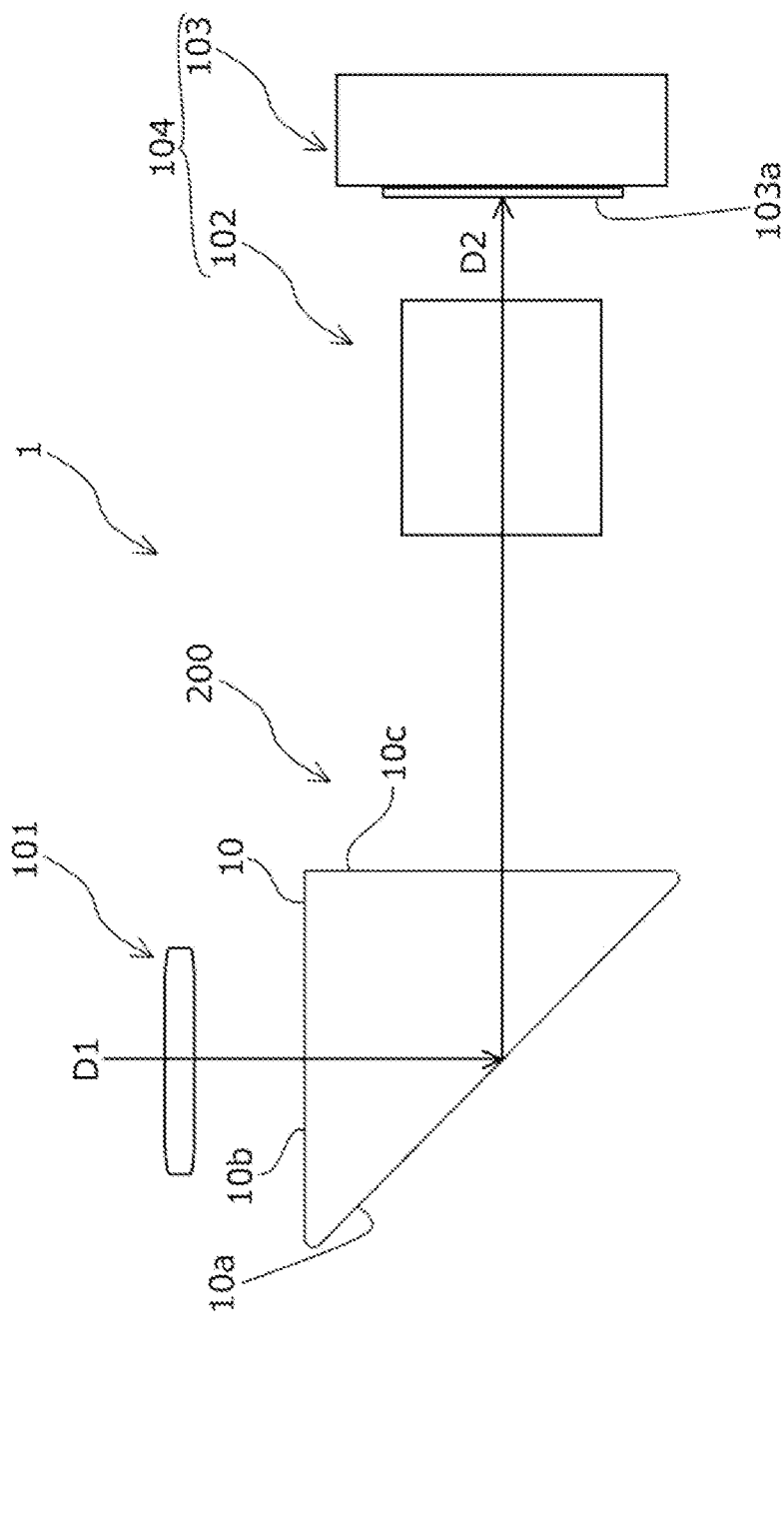
FIG. 2 is a schematic side view of an optical unit according to the embodiment of the present invention.

FIG. 2 is a side view which schematically illustrates the optical unit 1 of the present embodiment. As illustrated in FIG. 2, the optical unit 1 of the present embodiment has a reflection unit 200 as the movable body, including a prism 10 which serves as a reflection portion, a camera 104 having a substrate 103 on which an imaging element 103a is provided and a lens 102. The reflection unit 200 has a light flux to enter in the incident direction D1 from outside via the lens 101 on an incident surface 10b, causes the incident light flux to be reflected by a reflection surface 10a of the prism 10 and the incident light flux to be emitted to a reflection direction D2 from an emitting surface 10c toward the imaging element 103a. Although the reflection unit 200 of the present embodiment includes the prism 10 as the reflection portion, the configuration of the reflection portion is not limited to the prism 10, that is, the reflection unit 200 may, for example, employ a configuration including a mirror as the reflection portion. The incident direction D1 is along the Y-axis direction, while the reflection direction D2 is substantially along the Z-axis direction but changes due to displacement of the prism 10.

[Configuration of Reflection Unit, which is Movable Body]

Figure 3:
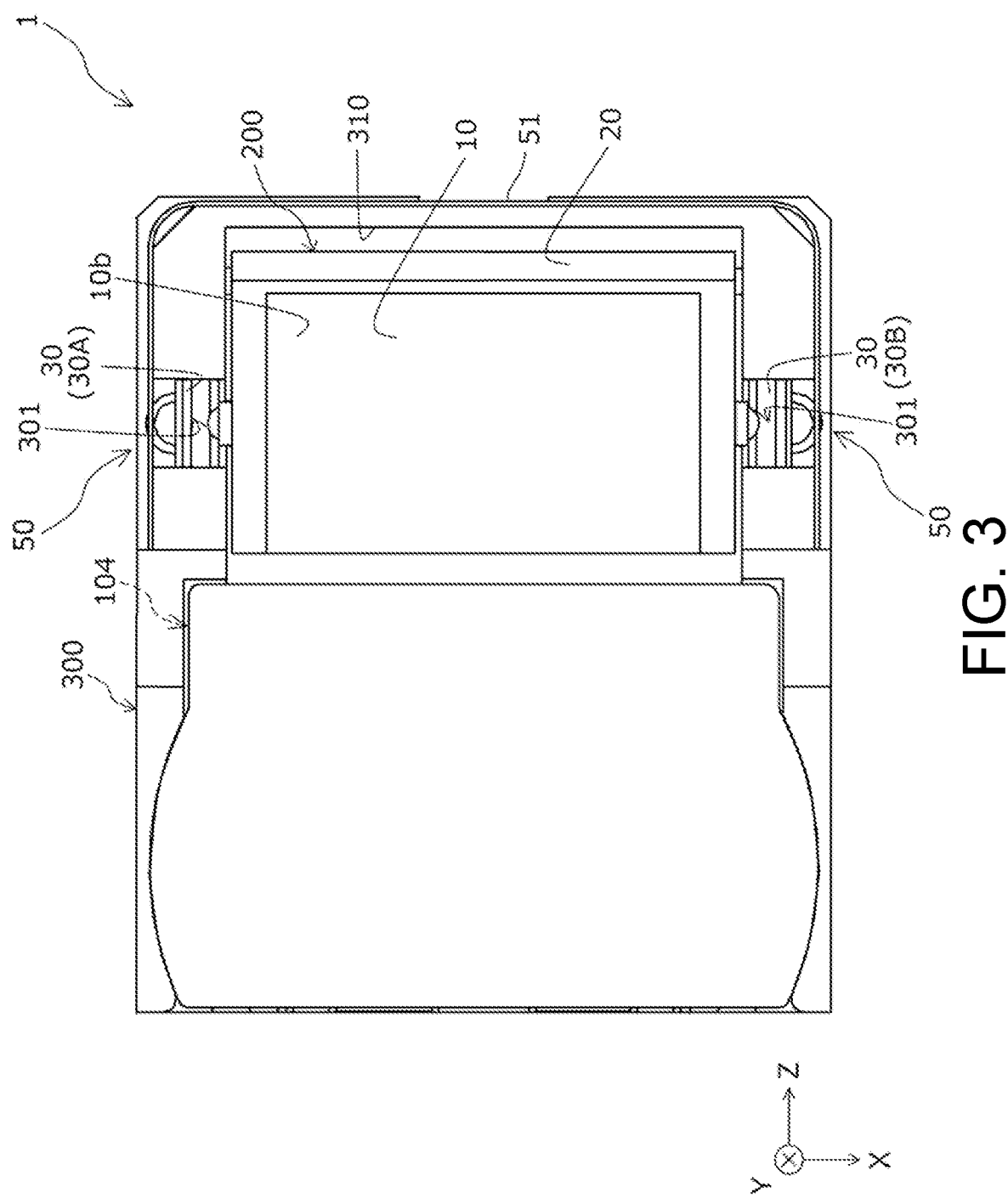
FIG. 3 is a plan view of the optical unit according to the embodiment of the present invention.
Figure 4:
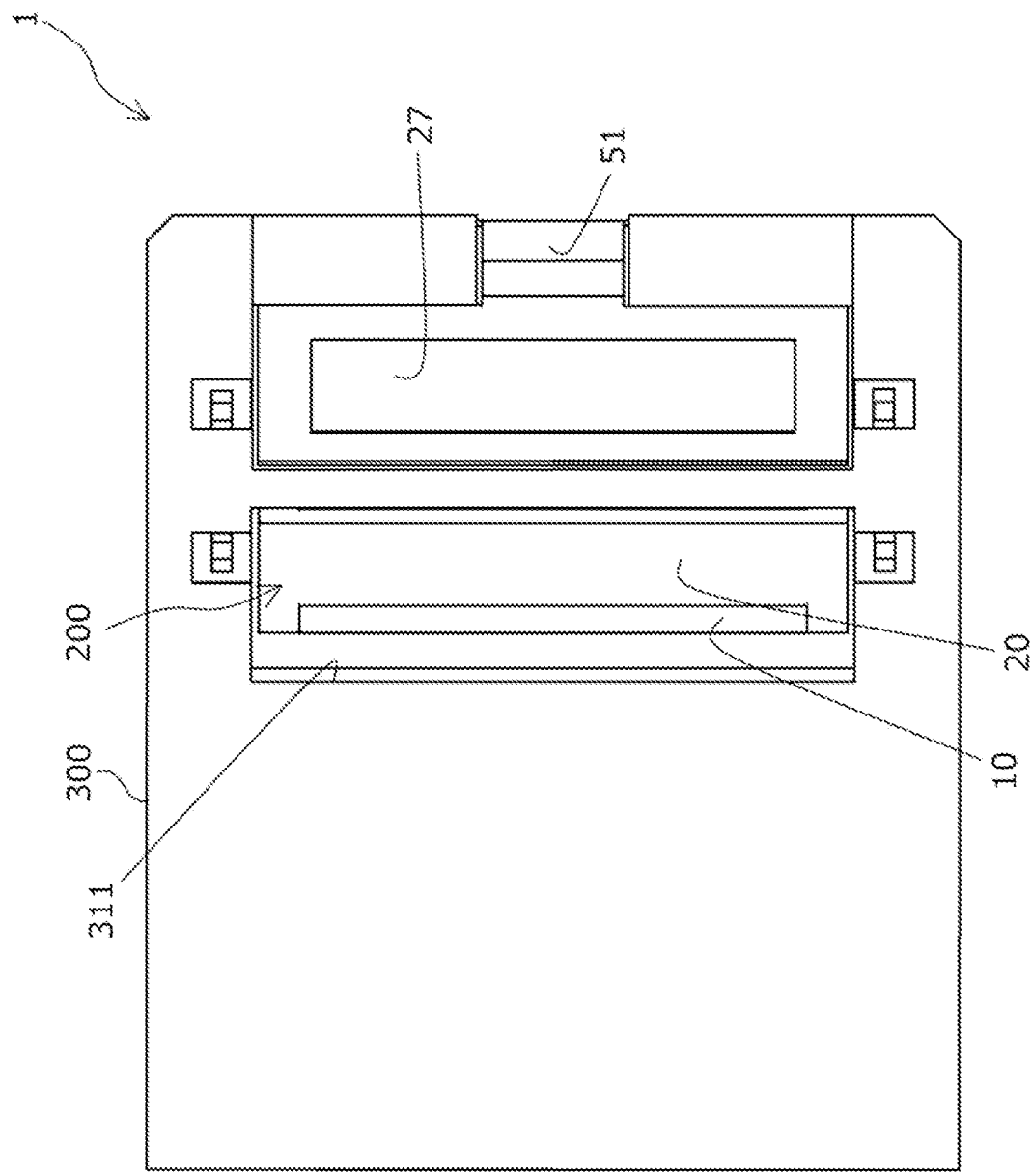
FIG. 4 is a bottom view of the optical unit according to the embodiment of the present invention.
Figure 5:
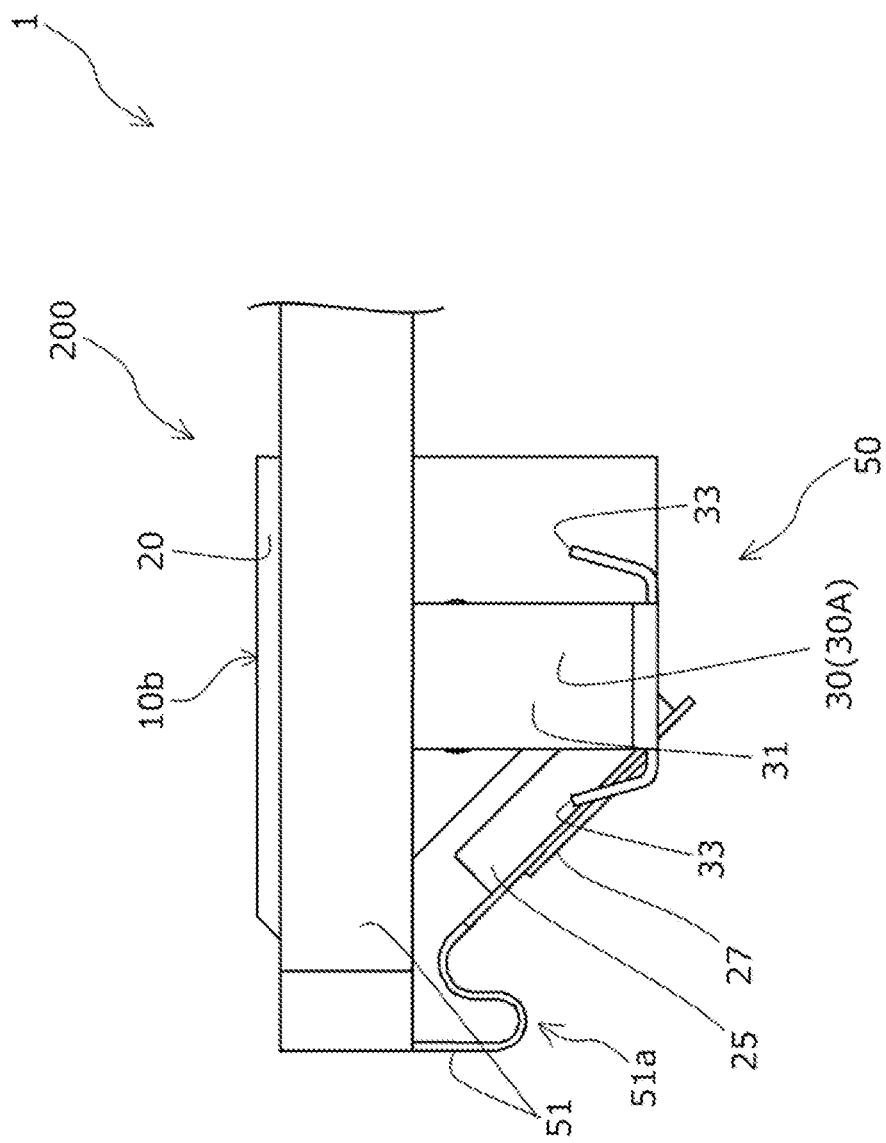
FIG. 5 is a side view illustrating a part of internal configuration of the optical unit according to the embodiment of the present invention.
Figure 6:
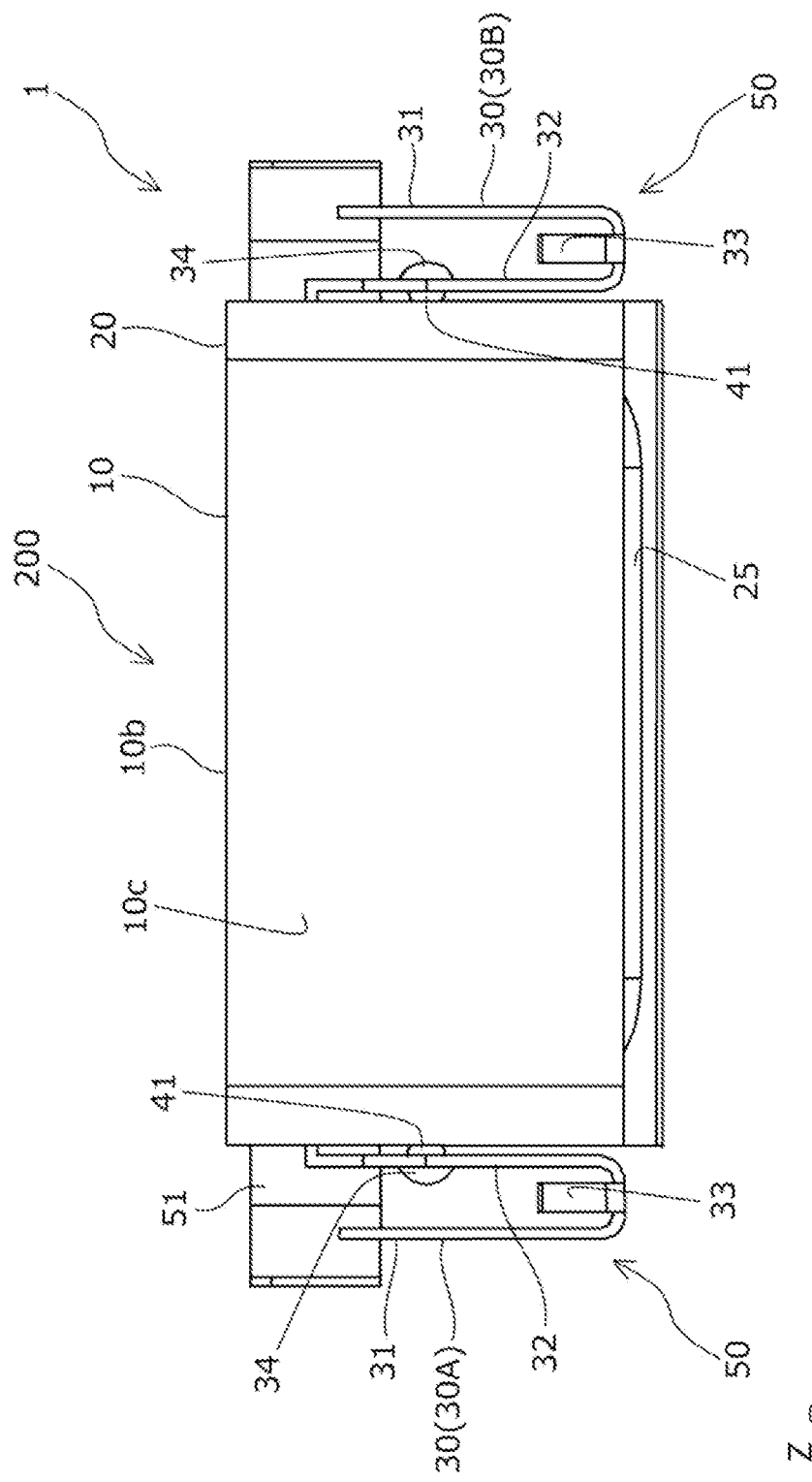
FIG. 6 is a front view illustrating a part of the internal configuration of the optical unit according to the embodiment of the present invention.
Figure 7:
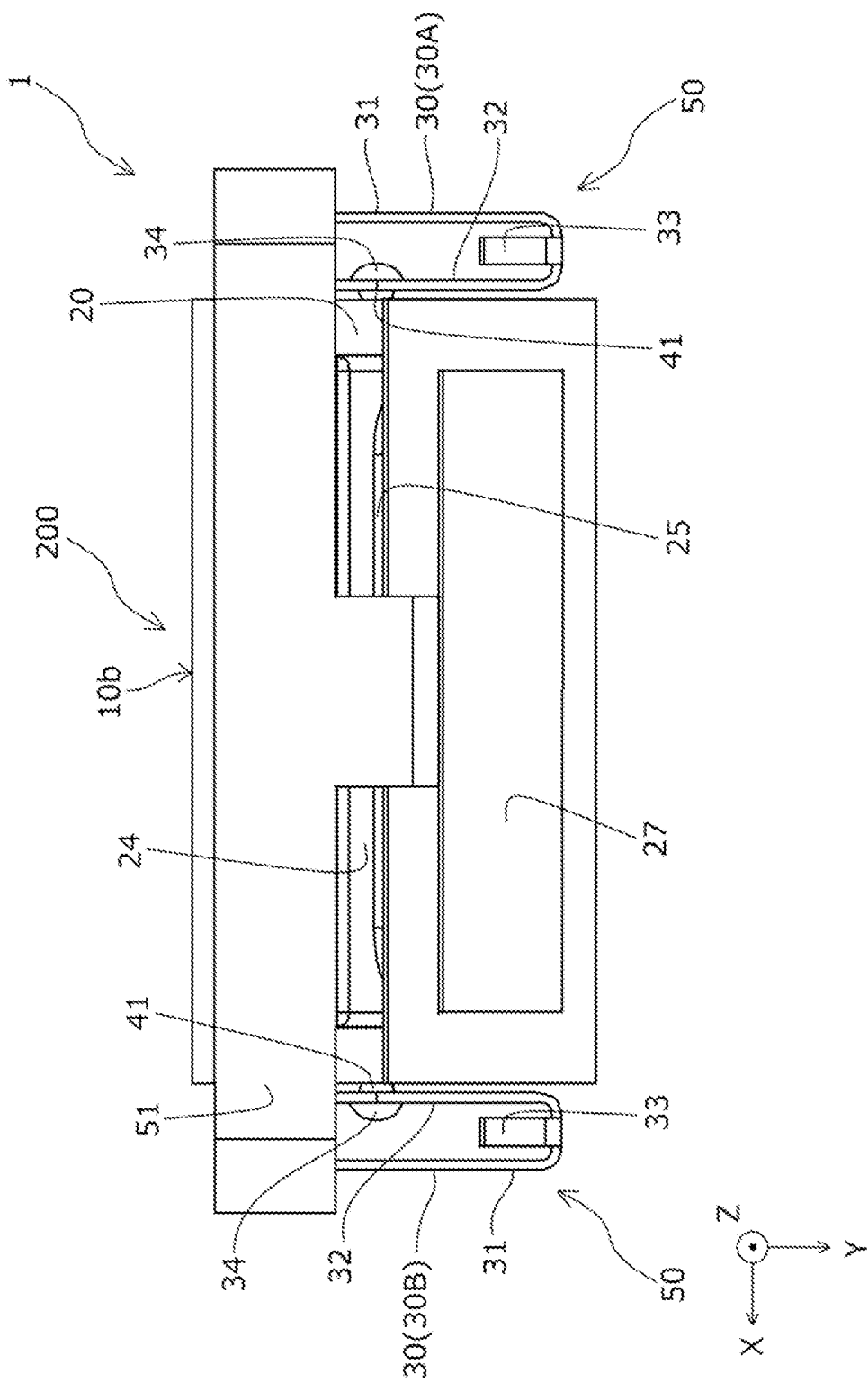
FIG. 7 is a rear view illustrating a part of the internal configuration of the optical unit according to the embodiment of the present invention.

FIG. 3 is a plan view of the optical unit 1 of the present embodiment. Further, FIG. 4 is a bottom view of the optical unit 1 of the present embodiment. Further, FIG. 5 is a side view illustrating an internal configuration of a peripheral portion of the reflection unit 200 in the optical unit 1 of the present embodiment. Further, FIG. 6 is a front view illustrating the internal configuration of the peripheral portion of the reflection unit 200 in the optical unit 1 of the present embodiment. And FIG. 7 is a rear view illustrating the internal configuration of the peripheral portion of the reflection unit 200 in the optical unit 1 of the present embodiment. The optical unit 1 in the present embodiment is configured so that the reflection unit 200 can rotate with respect to the fixed body 300 with the X-axis direction as a rotation axis. As illustrated in FIGS. 3 to 7, the reflection unit 200 has the prism 10 and a holder 20 which supports the prism 10.

The holder 20 is a frame body which is constructed separately from the prism 10 and supports the prism 10. Thus, the reflection unit 200 is a movable body that supports the reflection portion. The holder 20 has a spherical body 41 at an end in the −X direction and at an end in the +X direction. The spherical body 41 is engaged with a concave portion 34 of the spring member 30 fixed to the fixed body 300, and together with the concave portion 34 constitutes a rotation axis in the X-axis direction. With the holder 20 having such a configuration, the reflection unit 200 can rotate with respect to the fixed body 300 with the X-axis direction as the rotation axis while supporting the prism 10. Details of a rotation support mechanism 50 having the spring member 30 and the spherical body 41 and the like will be described later.

[Fixed Body]

The fixed body 300, as illustrated in FIG. 3, fixes two spring members 30, that is, a spring member 30A and a spring member 30B, to the fixing portion 301 and holds the reflection unit 200 with the X-axis direction as the rotation axis rotatably by the spring member 30A and the spring member 30B between the spring member 30A and the spring member 30B. The camera 104 is held inside of the reflection unit 200 on the −Z direction side.

As illustrated in FIG. 3, an opening 310 is provided and opened on the −Y direction side in the fixed body 300 in arrangement in which the entire reflection unit 200 is visible. As illustrated in FIG. 4, an opening 311 is provided on the +Y direction side in the fixed body 300 in arrangement in which a part of the reflection unit 200 and a part protruding in the +Y direction side of the reflection unit 200 is visible. With this configuration, the reflection unit 200 is prevented from colliding with the fixed body 300 on the +Y and −Y direction sides when the reflection unit 200 is rotated with respect to the fixed body 300. On the +Z direction side of the fixed body 300, a depression 320 (see FIG. 12) is formed so that the rotatable range of the reflection unit 200 is not narrowed with respect to the fixed body 300.

Expressed differently, in the optical unit 1 of the present example, the fixed body 300 has the depression 320 and the openings 310 and 311 formed on an extension line of a moving direction accompanying the rotation of the reflection unit 200. As described above, the configuration in which the depression 320 or the openings 310 and 311 are formed on the extension line of the moving direction accompanying the rotation of the reflection unit 200 allows the movable range of the reflection unit 200 with respect to the fixed body 300 to be expanded particularly effectively.

However, the reflection unit 200 can be brought into contact with the depression 320 of the fixed body 300 by rotating the reflection unit 200 largely with respect to the fixed body 300. Expressed differently, the depression 320 serves as a regulation portion which regulates a rotation amount of the reflection unit 200 with respect to the fixed body 300. The depression 320 and the parts of the reflection unit 200 in contact with the depression 320 are both collision-resistant portions, so that the reflection unit 200 and the fixed body 300 will not be damaged even if the depression 320 collides with the portions.

[Rotation Support Mechanism]

Figure 8:
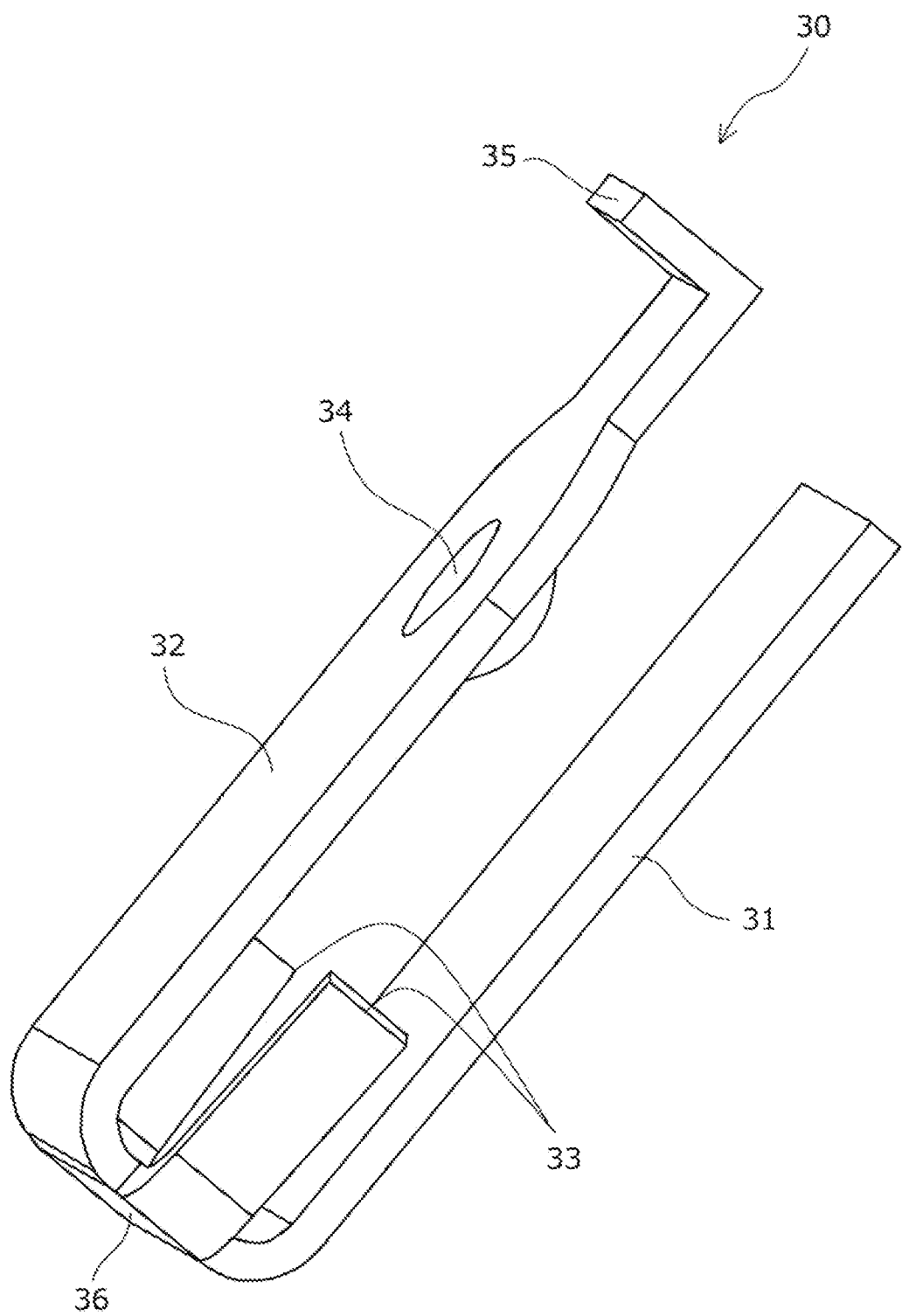
FIG. 8 is a perspective view illustrating a spring member of the optical unit according to the embodiment of the present invention.
Figure 9:
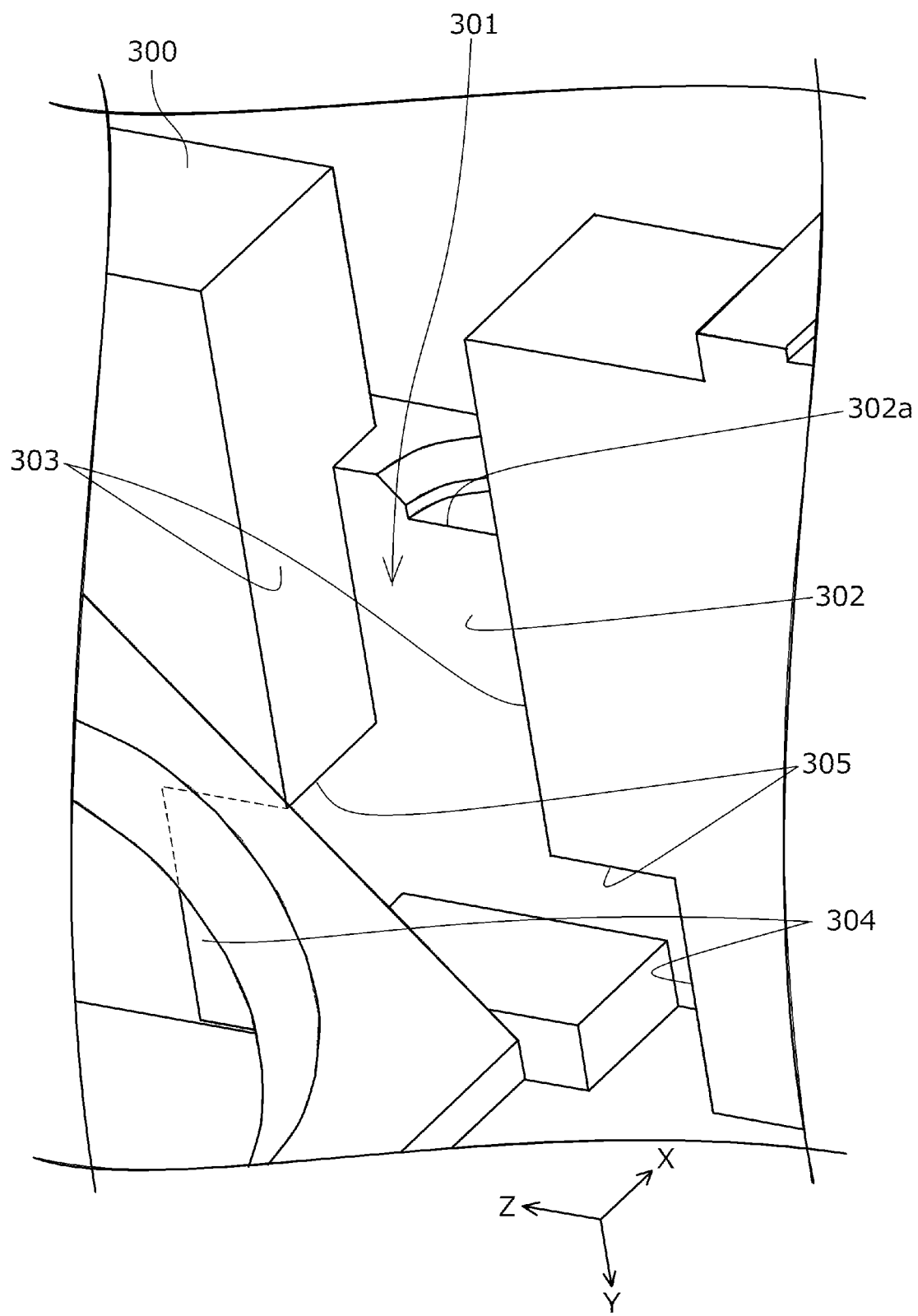
FIG. 9 is a perspective view illustrating a fixed position of the spring member of the optical unit according to the example of the present invention.
Figure 10:
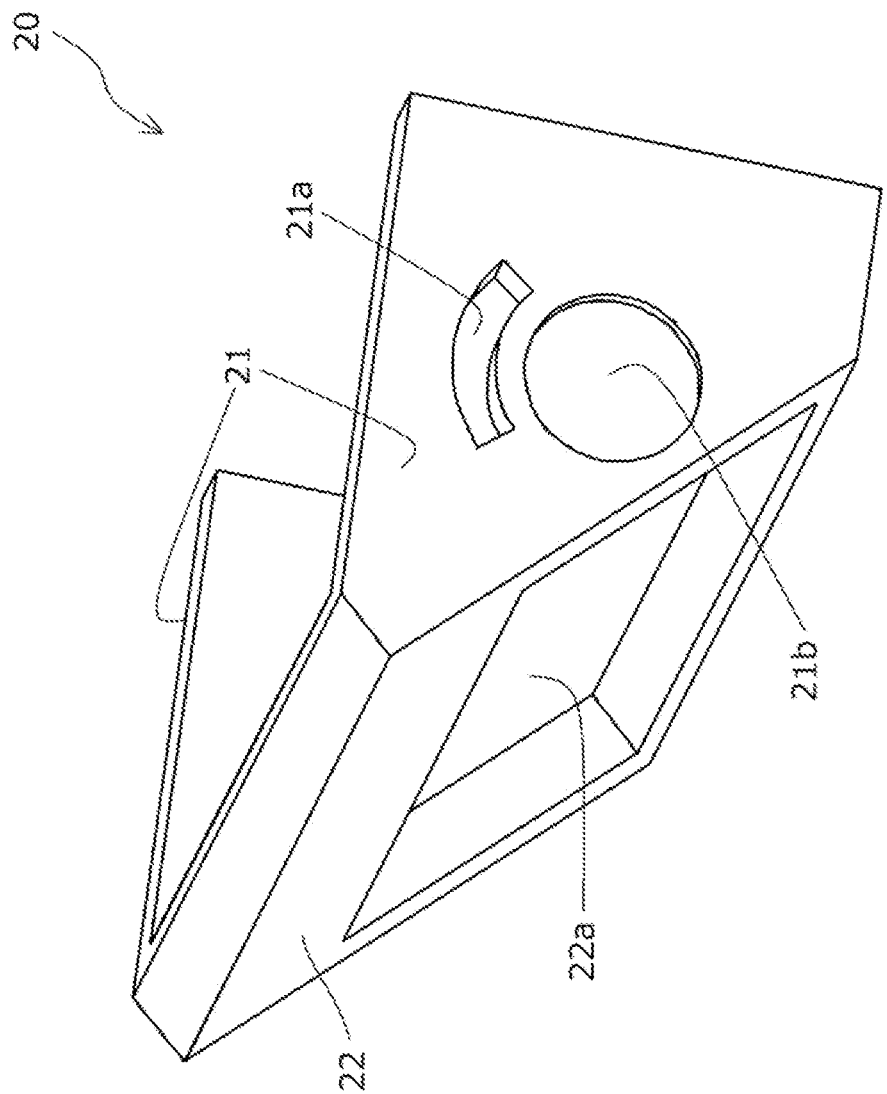
FIG. 10 is a perspective view illustrating a movable body of the optical unit according to the embodiment of the present invention.
Figure 11:
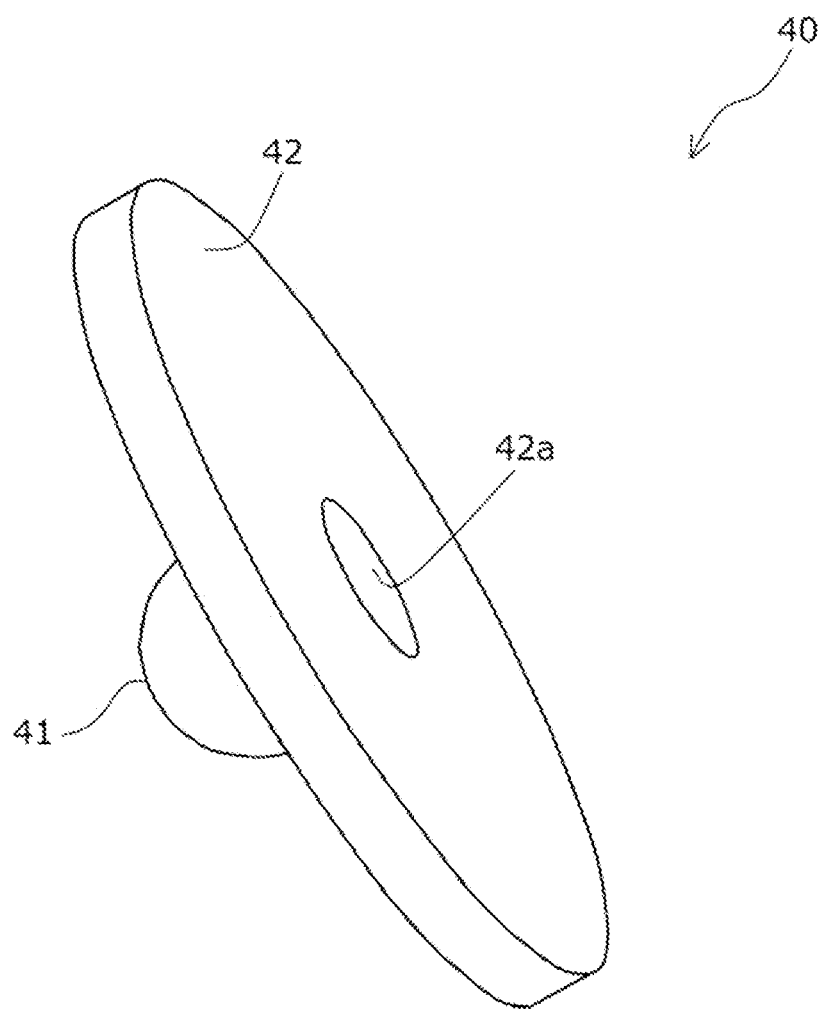
FIG. 11 is a perspective view illustrating a rotation support mechanism which is an engaging portion with the spring member of the optical unit according to the embodiment of the present invention.

Next, the rotation support mechanism 50, which is an essential part in the optical unit 1 of the present embodiment, will be described. FIG. 8 is a perspective view of the spring member 30 constituting the rotation support mechanism 50. Further, FIG. 9 is a partial perspective view of the fixed body 300 illustrating a peripheral portion of the fixing portion 301 of the spring member 30. Further, FIG. 10 is a perspective view of the holder 20 illustrating a mounting portion 21b and the like of a spherical-body holding portion 40 in which the spherical body 41 constituting the rotation support mechanism 50 is provided. And FIG. 11 is a perspective view of the mounting portion 21b of the spherical-body holding portion 40, which is an engaging portion with the spring member 30. The rotation support mechanism 50 has a spherical-body holding portion 40 fixed to the holder 20 and the spring member 30 fixed to the fixed body 300.

As illustrated in FIG. 8, the spring member 30 has an inner flat-plate portion 32 provided with a concave portion 34 which is a spherically depressed spherical concave surface, and an outer flat-plate portion 31 directed to face the inner flat-plate portion 32 by bending the spring member 30 into a U-shape with reference to a root portion 36. The inner flat-plate portion 32 and the outer flat-plate portion 31 have a plate spring structure in which a force is applied in a direction away from each other on the side opposite to the root portion 36. In addition, the spring member 30 includes two protruding portions 33 extending from directions different from the inner flat-plate portion 32 and the outer flat-plate portion 31 of the root portion 36. The two protruding portions 33 are provided at positions facing each other, but are structured to be subjected to a force in a direction away from each other on the side opposite to the root portion 36.

The spring member 30 is fixed to the fixing portion 301 illustrated in FIG. 9 by being inserted in the +Y direction into the fixing portion 301 with the root portion 36 side in a leading direction. The arrangement of the spring member 30 when it is inserted into the fixing portion 301 is arrangement in which the outer surface 302 of the fixing portion 301 is brought into contact with the outer flat-plate portion 31. That is, when the spring member 30 is inserted into the fixing portion 301, the outer flat-plate portion 31 is brought into contact with the outer surface 302, the inner flat-plate portion 32 is brought into contact with a side surface 21 of the holder 20 illustrated in FIG. 10, and the protruding portion 33 is brought into contact with first facing surfaces 303 facing in the Z-axis direction. Here, in the fixing portion 301, second facing surfaces 304 with spacing wider than the first facing surfaces 303 are provided on a depth side (+Y direction side) of the first facing surfaces 303. Therefore, when the spring member 30 is inserted to the depth of the fixing portion 301, the protruding portion 33 is brought into contact with the second facing surfaces 304, and the movement of the protruding portion 33 in the −Y direction is restricted by eave portions 305 formed between the first facing surfaces 303 and the second facing surfaces 304. By having such a shape, the spring member 30 is fixed to the fixing portion 301 by being inserted deeply into the fixing portion 301.

As illustrated in FIG. 10, the side surface 21 of the holder 20 includes the mounting portion 21b of the spherical-body holding portion 40 illustrated in FIG. 11. The spherical body 41 of the spherical-body holding portion 40 mounted on the mounting portion 21b fits into the concave portion 34 of the spring member 30 fixed to the fixing portion 301. As described above, the inner flat-plate portion 32 and the outer flat-plate portion 31 have a plate spring structure in which a force is applied in the direction away from each other on the side opposite to the root portion 36, so that the concave portion 34 is pressed onto the spherical body 41 side. Therefore, a preload is applied by the spring member 30 in a direction along the X-axis direction to the reflection unit 200 through the spherical body 41. A contact point between the concave portion 34 and the spherical body 41 becomes the rotation axis of the reflection unit 200 with respect to the fixed body 300. The rotation axis extends in a direction along the X-axis direction, and is arranged to pass through the substantial center of gravity of the entire reflection unit 200.

Further, as illustrated in FIG. 8, the inner flat-plate portion 32 has a convex portion 35 projecting outwardly, and as illustrated in FIG. 10, an arc-shaped groove 21a is formed in the side surface 21 of the holder 20. As the spring member 30 is fixed to the fixing portion 301, the convex portion 35 fits into the groove 21a. With this configuration, the spring member 30 is inserted to the depth of the fixing portion 301, and the convex portion 35 fits into the groove 21a, whereby the reflection unit 200 is prevented from coming out with respect to the spring member 30. As described above, the spring member 30 is configured to prevent the spring member 30 from coming out of the fixed body 300, so that the reflection unit 200 is prevented from coming out of the fixed body 300. Since the arc-shaped groove 21a is formed in the direction along the arc with the contact point between the concave portion 34 and the spherical body 41 as the rotation center, the insertion of the convex portion 35 into the groove 21a does not prevent the reflection unit 200 from rotating with respect to the fixed body 300.

The rotation support mechanism 50 of the present embodiment is a rotation support mechanism that rotates the reflection unit 200 with respect to the fixed body 300 with the axial direction (X-axis direction) crossing the incident direction D1 (Y-axis direction) and the reflection direction D2 (Z-axis direction) as a rotation axis. As described above, the rotation support mechanism 50 has the U-shaped spring member 30 which is disposed between the fixed body 300 and the reflection unit 200 in the X-axis direction and applies a force in the direction to widen the space between the fixed body 300 and the reflection unit 200 in the X-axis direction. Here, the spring member 30 has the concave portion 34 as the rotation-axis first forming member constituting the rotation axis, and the reflection unit 200 has the spherical body 41 as the rotation-axis second forming member constituting the rotation axis together with the concave portion 34. The concave portion 34 and the spherical body 41 are disposed at positions where the rotation axis passes through the substantial center of gravity position of the reflection unit 200.

As described above, in the optical unit 1 of the present embodiment, the rotation support mechanism 50 has the U-shaped spring member 30 that applies a force in the direction to widen the space between the fixed body 300 and the reflection unit 200 in the axial direction, and the concave portion 34 provided in the spring member 30 and the spherical body 41 provided in the reflection unit 200 form the rotation axis disposed at a position passing through the substantial center of gravity position of the reflection unit 200. By forming such the rotation axis at the position passing through the substantial center of gravity position of the reflection unit 200, the movable range of the reflection unit 200 with respect to the fixed body 300 can be increased even if the gap between the surface of the reflection unit 200 (the side surface 21 of the holder 20) on which the concave portion 34 and the spherical body 41 are formed and the surface of the fixed body 300 (the surface on which the fixing portion 301 is provided) is narrowed. Also, by having the U-shaped spring member 30 that applies a force in the direction to widen the space between the fixed body 300 and the reflection unit 200 in the X-axis direction, a configuration for applying a preload to the reflection unit 200 is easily formed. Furthermore, since the rotation axis is disposed at the position passing through the substantial center of gravity position of the reflection unit 200, displacement by its own weight (self-weight sag) of the reflection unit 200 with respect to the fixed body 300 can be prevented.

In the optical unit 1 of the present embodiment, the rotation-axis first forming member and the rotation-axis second forming member are the concave portion 34 and the spherical body 41 configurated such that one of which, the spherical body 41, has a convex spherical surface and the other of which, the concave portion 34, has a concave spherical surface on which the convex spherical surface slides. With this configuration, the rotation-axis first forming member and the rotation-axis second forming member can be brought into point contact, which reduces a sliding load and allows a small bearing structure. In the optical unit 1 of the present embodiment, the optical unit 1 has the concave portion 34 as the rotation-axis first forming member and the spherical body 41 as the rotation-axis second forming member, but it may also be configured to have the spherical body 41 as the rotation-axis first forming member and the concave portion 34 as the rotation-axis second forming member. Furthermore, the rotation axis may be configured with a configuration other than the convex spherical surface and the concave spherical surface.

Here, as illustrated in FIG. 11, in the optical unit 1 of the present embodiment, the spherical-body holding portion 40 having the convex spherical surface (spherical body 41) is formed by fixing the spherical body 41 having a diameter larger than a hole 42a to a base 42 having the hole 42a. With this configuration, the bearing structure can be easily configured. The spherical-body holding portion 40 in the present embodiment is fixed by welding the spherical body 41 to the hole 42a, since all the constitutional members of the spherical-body holding portion 40 are metal, but a method of fixing the spherical body 41 to the hole 42a is not limited to welding.

Further, as described above, in the optical unit 1 of the present embodiment, the spring member 30 is fixed at the fixed position of the fixed body 300 by being inserted in the insertion direction (+Y direction in FIG. 9) crossing the axial direction (X-axis direction) of the rotation axis between the fixed body 300 and the reflection unit 200, and has a protruding portion 33 which protrudes in a direction opposite to the insertion direction and is displaceable in a displacement direction (Z-axis direction in FIG. 9) crossing the insertion direction. The fixed body 300 has the eave portion 305 as the hooking portion on which the protruding portion 33 is displaced in the displacement direction and the protruding portion 33 is hooked as the spring member 30 is inserted into the fixed position. With this configuration, the optical unit 1 of the present embodiment prevents the spring member 30 fixed at the fixed position from coming out in the direction opposite to the insertion direction.

As described above, in the optical unit 1 of the present embodiment, the reflection unit 200 has the arc-shaped groove 21a with the rotation center of the rotation axis as the rotation center, and the spring member 30 has the convex portion 35 inserted into the groove 21a. Since the optical unit 1 of the present embodiment has such a configuration, the removal of the reflection unit 200 from the spring member 30 and the coming-out of the reflection unit 200 from the fixed body 300 are restricted, and the rotation of the reflection unit 200 with respect to the fixed body 300 is prevented from being hindered by interference between the groove 21a and the convex portion 35.

Here, in the optical unit 1 of the present embodiment, the groove 21a is configured to have such a length that the groove 21a and the convex portion 35 are not in contact with each other in the arc direction even when the groove 21a is rotated to the maximum as the reflection unit 200 is rotated with respect to the fixed body 300. With this configuration, even when the reflection unit 200 is rotated to the maximum with respect to the fixed body 300, the rotation of the reflection unit 200 with respect to the fixed body 300 is prevented from being hindered by interference between the groove 21a and the convex portion 35. In addition, by not using the convex portion 35 and the arc-shaped groove 21a, which are structurally difficult to be made robust, as regulation portions for the rotation of the reflection unit 200 in the arc direction, damage on the convex portion 35 and the groove 21a is prevented.

As described above, in the optical unit 1 of the present embodiment, the spring member 30 is fixed at the fixed position of the fixed body 300 by being inserted in the insertion direction between the fixed body 300 and the reflection unit 200. Here, the spring member 30 is configured so as to be positioned such that the contact position with the fixed body 300 in the direction to widen the space between the fixed body 300 and the reflection unit 200 is aligned with the rotation axis. Expressed differently, the point of action of the force by the fixed body 300 to the spring member 30 is positioned to be aligned with the rotation axis. Specifically, the position of a contact point 302a with the outer flat-plate portion 31 in the outer surface 302 in FIG. 9 is configured to be aligned with the rotation axis in the Y-axis direction. With this configuration, misalignment of the rotation axis can be effectively suppressed. In the present embodiment, the position of the contact point 302a is configured to be aligned with the rotation axis, but the contact position may be configured to be aligned with the rotation axis by adjusting a length of the outer flat-plate portion 31.

[Drive Mechanism]

Figure 12:
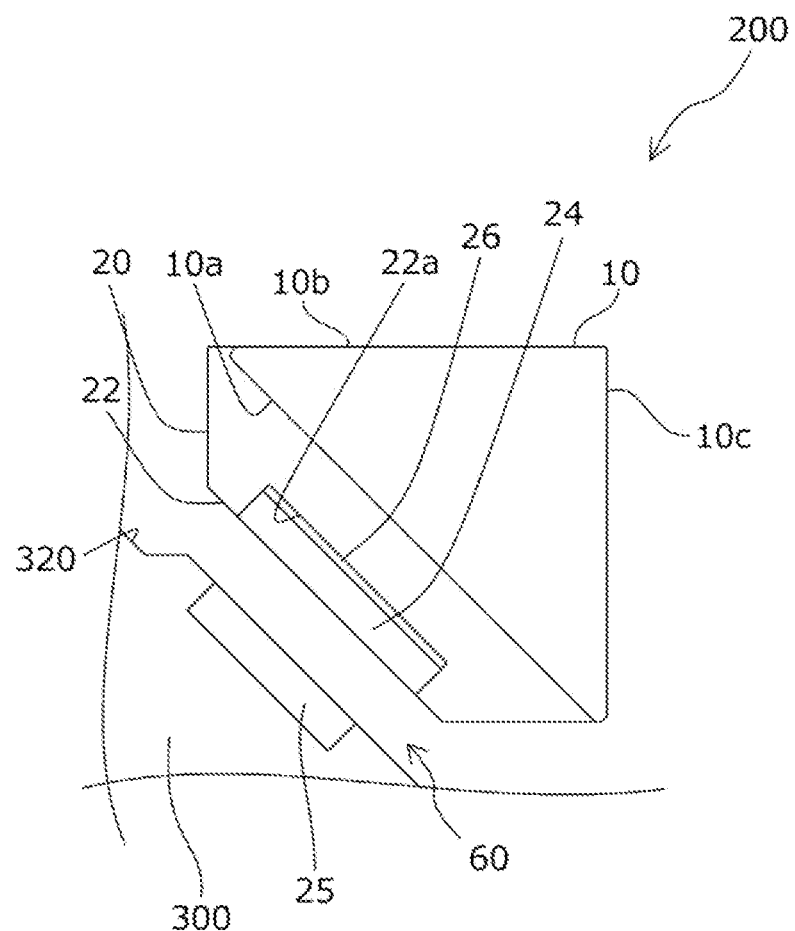
FIG. 12 is a schematic side cross-sectional view of the optical unit according to the embodiment of the present invention.
Figure 12:
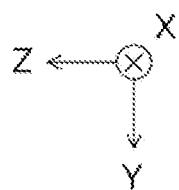

Next, a drive mechanism 60 that drives the reflection unit 200 supported by the rotation support mechanism 50 will be described. FIG. 12 is a schematic side cross-sectional view of the optical unit 1 of the present embodiment. As illustrated in FIG. 12, the drive mechanism 60 has a magnet 24 placed on a placing portion 22a of a rear surface 22 of the holder 20 and a coil 25 formed in the fixed body 300. The magnet 24 is placed on and fixed to the placing portion 22a while being bonded to yoke 26 made of a flat plate-shaped iron.

As illustrated in FIGS. 4, 5 and 7, a magnetic body 27 is provided on the side opposite to the magnet 24 with reference to the coil 25 in the direction where the magnet 24 and the coil 25 face each other. Thus, the magnet 24 and the magnetic body 27 form a magnetic spring that adjusts the position of the reflection unit 200 with respect to the fixed body 300 by the magnet 24 and the magnetic body 27 attracted to each other, and the automatic origin adjustment of the reflection unit 200 with respect to the fixed body 300 is made possible.

The coil 25 is connected to a flexible wiring board 51. Here, as illustrated in FIG. 5, by forming a sag 51a in the flexible wiring board 51, workability in attaching the coil 25 to the fixed body 300 is improved.

The present invention is not limited to the above-described embodiments, but can be realized with various configurations without departing from the spirit of the present invention. For example, technical features in the embodiments corresponding to the technical features in each of the aspects described in SUMMARY may be appropriately replaced or combined to solve some or all of the problems described above, or to achieve some or all of the effects described above. Further, unless the technical features are described as essential in the present specification, it may be omitted as appropriate.

What is claimed is:

1. An optical unit comprising:
a reflection portion, configured to reflect an incident light flux incident from outside in a reflection direction from an incident direction to an imaging element on a reflection surface;
a movable body, configured to support the reflection portion;
a fixed body; and
a rotation support mechanism, configured to rotate the movable body with respect to the fixed body with an axial direction crossing the incident direction and the reflection direction as a rotation axis, wherein
the rotation support mechanism has: a spring member in a U-shape that is disposed between the fixed body and the movable body in the axial direction and applies a force in a widening direction to widen a space between the fixed body and the movable body in the axial direction;
the spring member has a rotation-axis first forming member that constitutes the rotation axis;
the movable body has a rotation-axis second forming member that constitutes the rotation axis together with the rotation-axis first forming member; and
the rotation-axis first forming member and the rotation-axis second forming member are disposed at positions where the rotation axis passes through a center of gravity position of the movable body.

2. The optical unit according to claim 1, wherein
one of the rotation-axis first forming member and the rotation-axis second forming member has a convex spherical surface, and
the other of the rotation-axis first forming member and the rotation-axis second forming member has a concave spherical surface on which the convex spherical surface slides.

3. The optical unit according to claim 2, wherein
the convex spherical surface is formed by fixing, to a base having a hole, a spherical body having a diameter larger than the hole.

4. The optical unit according to claim 1, wherein
the spring member is fixed at a fixed position of the fixed body by being inserted in an insertion direction crossing the axial direction in the space and has a protruding portion that protrudes in a direction opposite to the insertion direction and is displaceable in a displacement direction crossing the insertion direction; and
the fixed body has a hooking portion on which the protruding portion is displaced in the displacement direction and hooked as the spring member is inserted into the fixed position.

5. The optical unit according to claim 1, wherein
the movable body has a groove in an arc-shape with a center of rotation of the rotation axis as the center of rotation; and
the spring member has a convex portion that is inserted into the groove.

6. The optical unit according to claim 5, wherein
the groove has such a length that the groove and the convex portion are not in contact with each other in an arc direction even when the movable body is rotated at the maximum as the movable body is rotated with respect to the fixed body.

7. The optical unit according to claim 1, wherein
the spring member is fixed at a fixed position of the fixed body by being inserted in the insertion direction in the space, and
a contact position with the fixed body in the widening direction is a position aligned with the rotation axis.

8. The optical unit according to claim 1, wherein
the fixed body has a depression or an opening formed on an extension line in a direction of movement accompanying a rotation of the movable body.

* * * * *